United States Patent [19]

Palmer

[11] Patent Number: 5,094,328
[45] Date of Patent: Mar. 10, 1992

[54] ELECTRO-RHEOLOGICAL CLUTCH APPLY SYSTEM

[75] Inventor: Walter E. Palmer, Indianapolis, Ind.

[73] Assignee: General Motors Corporation, Detroit, Mich.

[21] Appl. No.: 726,492

[22] Filed: Jul. 8, 1991

[51] Int. Cl.$^5$ ............... F16D 63/00; F16D 65/853; F16D 35/00

[52] U.S. Cl. .................. 192/21.5; 188/274; 192/58 C; 192/70.12; 192/70.14; 192/84 E; 192/106.1; 192/113 B

[58] Field of Search ............... 192/21.5, 58 C, 70.12, 192/70.14, 70.18, 84 E, 106.1, 112, 113 B; 188/267, 268, 274

[56] References Cited

U.S. PATENT DOCUMENTS

| | | | |
|---|---|---|---|
| 3,150,678 | 9/1964 | Nuber | 192/21.5 X |
| 3,788,099 | 1/1974 | Miller | 192/106.1 X |
| 4,444,298 | 4/1984 | Stangroom | 192/21.5 |
| 4,773,632 | 9/1988 | Hartel | 188/267 X |
| 4,802,560 | 2/1989 | Bhadra et al. | 188/264 F |
| 4,871,342 | 10/1989 | Boss et al. | 192/106.1 X |
| 4,896,752 | 1/1990 | Carlson et al. | 192/21.5 |
| 4,966,268 | 10/1990 | Asano et al. | 192/58 C |

Primary Examiner—Rodney H. Bonck
Attorney, Agent, or Firm—Donald F. Scherer

[57] ABSTRACT

An apply system for clutches employing electro-rheological fluid to transmit torque between two sets of interleaved plates. The plates are disposed within a stationary housing. The first set of plates is fixed to the stationary housing. The second set of plates is fixed to a shaft rotatable relative to the housing. A piston is coaxially disposed against the plates at one end of the interleaved plates. A piston apply chamber is located in the stationary housing on the opposite side of the piston. The electro-rheological fluid is circulated through the system by a pump, passing by the apply side of the piston, then between the plates, and then back to the pump. When there is a voltage potential between the plates, the flow between the plates is restricted and the pressure of the fluid on the piston builds, displacing the piston toward the plates. The plates are moved closer together by the piston. Contact between the plates is prevented by insulating elements mounted to alternate surfaces of the plates.

7 Claims, 1 Drawing Sheet

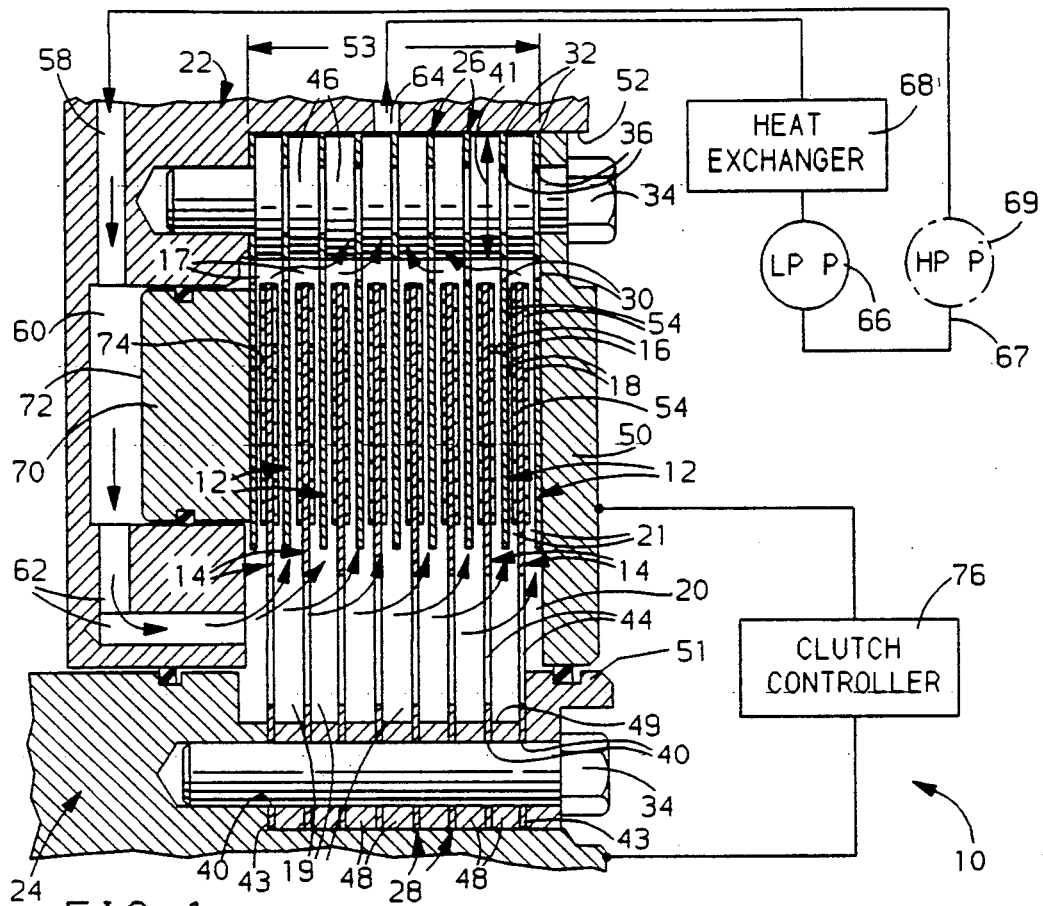
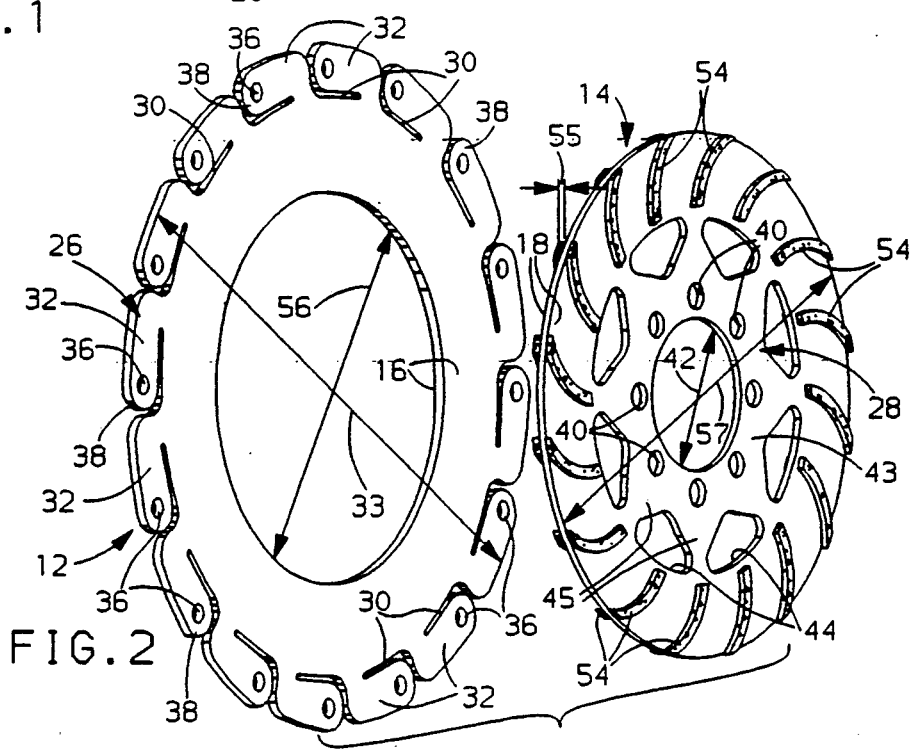

ELECTRO-RHEOLOGICAL CLUTCH APPLY SYSTEM

TECHNICAL FIELD

Electro-rheological clutches employ a fluid which increases in stiffness when it is exposed to an electric voltage potential. Electro-rheological clutches typically employ a high voltage clutch controller to establish the voltage potential between two sets of parallel clutch plates. The magnitude of the torque transmitted by the electro-rheological fluid between the two sets of plates is dependent on the voltage magnitude, the gap between the plate sets, and the electro-rheological properties of the fluid. The electro-rheological effect increases with the voltage potential, and decreases with an increase in the plate gap. With zero voltage between the plates, there is no electro-rheological effect, and the torque varies, as with conventional fluids, with the plate gap and the fluid viscosity.

BACKGROUND OF THE INVENTION

Optimal electro-rheological clutch performance requires the gap between plates be as small as possible. This increases the available electro-rheological torque. Small gaps, however, increase the risk of contact between plates. Contact between any of the two sets of plates, or shorting, would eliminate the voltage potential between the sets of plates, eliminating the electro-rheological effect of the clutch. Only a slight amount of distortion of one of the plates could have this effect. Thermal stresses within the plates at elevated temperatures could produce such distortion. Small plate gaps are also a disadvantage when there is no voltage potential between the plates. Small gaps increase the conventional viscous effects, resulting in increased viscous drag and heat generation.

SUMMARY OF THE INVENTION

This invention prevents shorting between the plates by placing insulating elements on alternating plate surfaces. This invention also reduces viscous drag between the plates when zero voltage is applied by providing gaps between the plates which are wide when the clutch is not engaged but narrow when there is a voltage potential between the two sets of plates.

A piston is used to press the plates closer together when there is a voltage potential between the plates. Fluid is circulated behind the piston and between the plates. When the voltage potential is applied between the plates, the flow of fluid between the plates is restricted, causing the pressure behind the piston to increase. As the pressure builds, the piston is displaced against the plates, moving the plates closer together. As the plates move closer together, the electro-rheological effect becomes stronger, further increasing the pressure behind the piston, which further displaces the piston. More piston displacement creates a higher apply force which produces more displacement. Through this bootstrapping, the displacement between the plates is reduced to the thickness of the insulating elements, the minimum possible.

It is an object of this invention to provide an apply system for an electro-rheological clutch which both prevents shorting between the plates when there is a voltage potential between the plates and also minimizes viscous drag between the plates when there is no voltage potential between the plates by employing a plurality of electrically non-conductive insulating elements between the sets of plates which prevent contact between the sets of plates, and also employing axially flexible plates which permit the gap between overlapping portions of the plates to decrease when a voltage potential is applied between the sets of plates.

It is also an object of this invention to provide an apply system for an electro-rheological clutch which supplements the torque developed by electro-rheological forces with frictional forces generated by pressing the plates and the intervening insulating elements together by employing an apply piston, two sets of electrically conductive plates, a plurality of electrically non-conductive insulating elements disposed between the sets of plates, a stationary housing inside of which are disposed the plates and the piston, and a high pressure pump to provide friction generating pressure to the piston.

DESCRIPTION OF THE DRAWINGS

FIG. 1 shows a sectional side view of an electro-rheological clutch apply system with schematic representations of some of the system elements.

FIG. 2 shows a perspective view of both a first plate and a second plate with insulating elements on the second plate.

DESCRIPTION OF THE PREFERRED EMBODIMENT

FIG. 1 shows an electro-rheological clutch apply system 10 employing a plurality of electrically conductive first plates 12 and second plates 14, each with parallel facing surfaces 16 and 18 on both sides of the plates 12 and 14. FIG. 2 shows the plates 12 and 14 more clearly. The facing surfaces 16 for the first plate 12 are overlapped by the second plate 14. The facing surfaces 18 for the second plate 14 are overlapped by the first plate 12. Torque is to be transmitted between the first plate facing surfaces 16 and the second plate facing surfaces 18 through electro-rheological fluid (not shown) distributed throughout the apply system 10. The plates 12 and 14 are disposed within a plate cavity 20 in a stationary housing 22. First plates 12 are separated from adjacent first plates 12 by a first plate gap 17. Second plates 14 are separated from adjacent second plates 14 by a second plate gap 19. A rotating shaft 24 is also disposed within the plate cavity 20 of the housing 22.

The second plates 14 are interleaved with, that is alternately disposed between, the first plates 12. The first plates 12 and the second plates 14 do not touch each other. The first plates and second plates are separated by a first plate to second plate gap 21.

The first plates 12 are mounted to the stationary housing 22. The second plates 14 are mounted to the rotating shaft 24. Both the first plates 12 and the second plates 14 have provisions for axial flexing between their respective mounting locations 26 and 28 and their respective facing surfaces 16 and 18. The first plates 12 have a plurality of essentially circumferential axial stiffness reduction slots 30 forming flex members 32 at an outside diameter 33 of the first plates 12. The flex members 32 have apertures 36 at an end 38 distal to the facing surfaces 16. The first plates 12 are mounted to the stationary housing 22 with bolts 34 passing through the apertures 36 in the end 38 of the flex members 32.

The second plates 14 have mounting locations 28 proximate to an inside diameter 42 of the second plates 14. The second plates 14 are mounted to the rotating shaft 24 by bolts 34 passing through apertures 40 in a hub portion 43 proximate to an inside diameter 42 of the second plates 14. The hub 43 is connected to the facing surface 18 by flex links 45 which remain after providing openings 44 in the plate. The flex links 45 provide a necessary amount of axial flexibility.

Both the flex links 45 of the second plates 14 and the flex members 32 of the first plates 12 must provide axial flexibility without too greatly diminishing the ability of the plates 12 and 14 to sustain and transmit torsional loads.

Electrically conductive first plate spacer rings 46 are placed between all first plates 12 at each of the mounting locations 26 for the first plate 12. The first plate spacer rings 46 are means for uniformly spacing the first plates 12 apart from one another. The first plate spacer rings 46 have an inside diameter (not shown) sufficiently large to allow the bolts 34 to pass freely through. The outside diameter 41 of the rings 46 must be small enough to avoid contacting the facing surface 16 of the first plate 12.

Electrically conductive second plate spacer discs 48 are placed between all second plates 14. Each disc 48 is annular in shape and covers the hub portion 43 of each second plate 14. The second plate spacer discs 48 have an outside diameter 49 not exceeding that of the second plate hub portion 43 so as not to reduce the axial flexibility of the second plates 14. The second plate spacer discs 48 are means for uniformly spacing the second plates 14 from one another.

A stationary housing end cover 50 and a rotating shaft end cover 51 together seal an open end 52 of the plate cavity 20 of the stationary housing 22. The rotating shaft end cover 51 is rotatably sealed against the stationary housing end cover 50.

Mounting bolts 34 pass through the stationary housing end cover 50, the apertures 36 in the flex members 32, and the spacer rings 46, then thread into the stationary housing 22. The cumulative length of these parts equals the length 53 of the plate cavity 22.

The rotating shaft end cover 51 overlaps primarily just the hub portion 43 of the second plates 14. Mounting bolts 34 pass through the rotating shaft end cover 51, the apertures 40 in the second plates 14, and the second plate spacer discs 48, then thread into the rotating shaft 24.

The second plates 14 have a plurality of electrically non-conducting insulating elements 54 mounted on the facing surfaces 18 on both sides of the second plates 14. The insulating elements 54 prevent contact between the first plate facing surfaces 16 and the second plate facing surfaces 18. The insulating elements 54 are made of a standard non-metallic friction material with known thermal and wear durability. The insulating elements 54 have a thickness 55 equal to a desired minimum distance between the first plate facing surfaces 16 and the second plate facing surfaces 18. The minimum distance is selected to maximize the stiffening effect of a voltage potential on the electro-rheological fluid. The insulating elements 54 as shown in FIG. 2 form identical volute shapes on the second plate facing surfaces 18 and are oriented so as to facilitate fluid flow between the first plates 12 and the second plates 14 from an inside diameter 56 of the first plates 12 to an outside diameter 57 of the second plates 14. The amount of area on the second plate facing surfaces 18 occupied by the insulating elements 54 is a small fraction of the facing surface 16, in the order of 1/5 of the facing surface.

The stationary housing 22 has a fluid inlet 58 fluidly connected to a piston apply cavity 60. The piston apply cavity 60 is in turn fluidly connected to a fluid passage 62 fluidly connected to the plate cavity 20. The plate cavity 20 is fluidly connected to a fluid outlet 64 located at a point outside of the outside diameter 57 of the second plate 14.

A low pressure pump 66, or alternatively a high pressure pump 69, is functionally interposed in a fluid flow path 67 between the stationary housing fluid outlet 64 and the stationary housing fluid inlet 58. The pump 66 pumps fluid to the stationary housing fluid inlet 58. A heat exchanger 68 is interposed in the fluid flow path 67 between the stationary housing fluid outlet 64 and the low pressure pump 66.

An apply piston 70 is disposed within the stationary housing 22, having an apply side 72 exposed to a fluid pressure from the low pressure pump 66. A loading side 74 of the piston 70 is contiguous with a proximate first plate 12.

A high voltage clutch controller 76 is electrically interposed between the stationary housing 22 and the rotating shaft 24. It is used to selectively apply a voltage potential between the first plates 12 and the second plates 14 to increase the stiffness of the electro-rheological fluid between the facing surfaces 16 and 18 of the plates 12 and 14. The clutch controller 76 is electrically connected to the rotating shaft 24 by means of a slip ring (not shown).

The operation of the electro-rheological clutch apply system 10 is described hereunder. The advantages of this invention can be more readily understood by following the flow of the electro-rheological fluid through the system 10 under various operating conditions.

The electro-rheological fluid is circulated freely through the system 10 at near zero pressure when there is no voltage potential between the plates 12 and 14. The plates 12 and 14 are in a neutral or flat orientation and the first plate to second plate gap 21 is at its maximum. The piston 70 is not applied because the pressure on both sides 72 and 74 is approximately equal.

The fluid enters the stationary housing 72 through the inlet. It travels from the inlet 58 to the piston apply cavity 60. The fluid flows from the piston apply cavity 60 to the plate cavity 20 via the fluid passage 62. The fluid enters the plate cavity 20 inside the inside diameter 56 of the first plates 12. Its flow across the length 53 of the plate cavity 20 is facilitated by the openings 44 in the second plates 14. The fluid then passes between the first plates 12 and the second plates 14 to reach the fluid outlet 64. After leaving the plate cavity 20, the fluid enters the heat exchanger 68 to cool the fluid, and then enters the pump 66 which forces the fluid back into the stationary housing inlet 58.

When the voltage is applied to the plates 12 and 14, the electro-rheological fluid between the facing surfaces 16 and 18 increases in stiffness. Flow of fluid between the facing surfaces 16 and 18 from the inside diameter 56 of the first plates 12 to the outside diameter 57 of the second plates 14 is greatly reduced. This restriction results in an increase in pressure in the plate cavity 20 inside of the inside diameter 56 of the first plate, and in the piston cavity 60. There is no restriction of fluid flow out of the piston cavity 60, so the pressure within the piston 60 cavity but outside of outside diameter 57 of the second plates 14 is relatively unaffected and remains low. The increase in pressure on the apply side 72 of the piston 70 relative to the pressure on the loading side 74 displaces the piston 70 toward the first and second plates 12 and 14, pressing the facing surfaces 16 and 18 of the plates 12 and 14 closer together while the mounting locations 26 and 28 of the plates 12 and 14 remain a fixed distance apart.

The plates 12 and 14 deflect, producing contact between the first plate facing surfaces 16 and the insulating elements 54 of the second plates 14, beginning with those plates 12 and 14 nearest the piston 70. The piston 70 reaches a maximum displacement when all first plate surfaces 16 are contacting the insulating elements 54 of adjacent second plates 14. At maximum displacement, plates 12 and 14 nearest the piston 70 will deflect a greater amount than plates 12 and 14 distal to the piston and more proximate to the stationary housing end cover 50. The axial flexibility of the plates 12 and 14 is sufficient to allow full piston 70 displacement with the pressure provided by the low pressure pump 66. The axial flexibility of the plates 12 and 14 is also sufficient to make any frictional drag torque produced by the contact between the insulators and the first plates insignificant relative to the torque produced by the electro-rheological forces. If the axial flexibility is not sufficient, and the frictional drag torque was significant, the insulating elements nearest the piston may exhibit wear, eventually permitting contact between the plates 12 and 14.

The pressure provided by the low pressure pump 66 must be limited to prevent a greater amount of piston force developing beyond what is required to obtain full piston travel. Applying more force beyond what is required for full piston travel would increase the amount of the frictional drag torque.

In an alternate embodiment a high pressure pump 69 is used in place of the low pressure pump 66 to increase the torque capacity of the clutch apply assembly 10. The high pressure pump increases the magnitude of pressure available to apply the piston 70. This in turn increases the available frictional torque to the point where it is significant relative to the torque provided by the electro-rheological forces. Increasing the portion of the facing surfaces 18 covered by insulating elements 54 may be necessary for the clutch 10 to sustain greater frictional loads.

When the voltage potential from the high voltage clutch controller is reduced to zero, the electro-rheological fluid once again flows freely between the first plates 12 and the second plates 14, reducing the pressure on the apply side 72 of the piston 70 relative to the pressure on the loading side of the piston 74 to zero. With the pressure in the piston cavity 62 released, the first plate to second plate gap 21 returns to its maximum, minimizing the drag between the first plates 12 and second plates 14.

The embodiments of the invention in which an exclusive property or privilege is claimed are defined as follows:

1. An apply system for an electro-rheological fluid plate clutch comprising:
   a plurality of electrically conductive first plates, having parallel facing surfaces, a mounting location, and a means for axial flexing disposed between the facing surfaces and the mounting area;
   a plurality of electrically conductive second plates, having parallel facing surfaces, a mounting location, and a means for axial flexing disposed between the facing surfaces and the mounting area, being rotatable relative to the first plates, being alternately and concentrically disposed between the first plates;
   a plurality of electrically non-conductive insulating elements, mounted on alternate plate facing surfaces, insulating the first plates from contact with the second plates;
   means for applying a voltage potential between the plurality of first plates and the plurality of second plates;
   means for providing uniform first plate gaps between the first plates at the mounting locations of the first plates;
   means for providing uniform second plate gaps between the second plates at the mounting locations of the second plates;
   an electro-rheological fluid, disposed throughout first plate to second plate gaps; and
   means for decreasing the first plate to second plate gaps with an increase of the voltage potential between the first plates and the second plates, the decrease in the first plate to second plate gap being limited by the thickness of the insulating elements.

2. An apply system for an electro-rheological plate clutch, comprising:
   a plurality of electrically conductive first plates with parallel facing surfaces and with means for providing axial compliance while maintaining torsional rigidity and having a mounting location proximate to an outside diameter;
   a plurality of electrically conductive second plates with parallel facing surfaces having openings for promotion of axial flow of fluid, being concentric with and axially interposed between the first plates, having means for providing axial compliance while maintaining torsional rigidity and having a mounting location proximate to an inside diameter;
   a plurality of electrically non-conductive insulating elements, mounted on alternate facing surfaces of the plates, having a thickness equal to a desired minimum distance between the first plate facing surfaces and the second plate facing surfaces, being thin strips shaped and oriented so as to facilitate fluid flow between the plates from an inside diameter of the first plates to an outside diameter of the second plates;
   a rotating shaft to which the second plates are rotatively fixed at the mounting location in a manner preventing relative rotation therebetween, ensuring electrical conductivity with the second plates, and providing uniform axial spacing of the second plates;
   the stationary housing, inside which the first plates, the second plates, and the rotating shaft are disposed, and to which the first plates are rotatively fixed at the mounting location in a manner preventing relative rotation therebetween and ensuring electrical conductivity with the first plates and providing uniform axial spacing of the first plates, having a fluid inlet fluidly connecting to a piston apply cavity which fluidly connects to a fluid passage which fluidly connects to a plate cavity at a point inside an inside diameter of the first plates, the plate cavity fluidly connecting to a fluid outlet at a point outside an outside diameter of the second plates;

a high voltage clutch controller electrically interposed between the stationary housing and the rotating shaft;

electro-rheological fluid, disposed throughout the apply system;

a pump functionally interposed in a fluid flow path from the stationary housing outlet to the stationary fluid inlet, pumping fluid to the stationary housing inlet;

a heat exchanger functionally interposed in the fluid flow path from the stationary housing outlet to the pressure pump; and an apply piston, disposed within the stationary housing, having an apply side exposed to a fluid pressure provided by the pressure pump, and having a loading side contiguous with a proximate first plate.

3. An apply system for an electro-rheological plate clutch as described in claim 2, further comprising:

the plurality of electrically conductive first plates having, as the means for providing axial compliance, axial stiffness reduction slots forming flex members at the outside diameter, with apertures at an end of the flex members;

the plurality of electrically conductive second plates having apertures in a hub portion and having, as means for providing axial compliance, flex links connecting the hub portion with the facing surfaces;

the plurality of electrically non-conductive insulating elements, preventing contact between the first plates and the second plates, forming identical volute shapes on the plate facing surfaces;

a bolt means for clamping the first plates through their apertures to the stationary housing, preventing relative rotation therebetween and ensuring electrical conductivity between the first plates and the stationary housing;

a bolt means for clamping the rotating plates through their apertures to the rotating shaft, preventing relative rotation therebetween and ensuring electrical conductivity between the second plates and the rotating shaft;

a ring means for uniformly spacing the first plates at the first plate mounting location; and a disc means for uniformly spacing the second plates at the second plate mounting location.

4. An apply system for an electro-rheological plate clutch as described in claim 2, further comprising:

the pump being a low pressure pump, limited to providing pressure sufficient to produce a maximum piston displacement.

5. An apply system for an electro-rheological plate clutch as described in claim 2, further comprising:

the pump being a high pressure pump, capable of providing pressure in excess of pressure sufficient to produce a maximum piston displacement.

6. An apply system for an electro-rheological plate clutch as described in claim 3, further comprising:

the pump being a low pressure pump, limited to providing pressure sufficient to produce a maximum piston displacement.

7. An apply system for an electro-rheological plate clutch as described in claim 3, further comprising:

the pump being a high pressure pump, capable of providing pressure in excess of pressure sufficient to produce a maximum piston displacement.

* * * * *